Reissued Apr. 9, 1935 Re. 19,529

UNITED STATES PATENT OFFICE 19,529

PROCESS FOR PRODUCING BLACK AND FOR PREVENTING THE WEAKENING OF THE FIBERS

Karl Schmidt, Munich Gladbach, Germany

No Drawing. Original No. 1,920,717, dated August 1, 1933, Serial No. 244,037, December 31, 1927. Application for reissue November 28, 1934, Serial No. 755,197. In Germany July 8, 1926

3 Claims. (Cl. 8—6)

My invention relates to a new and useful process, which is adapted to produce a very deep aniline black on the material and, at the same time prevent the weakening of the fibers.

The usual methods for producing aniline black employ a composition, containing three essential components:

1. An aniline salt, generally aniline hydrochloride or nitrate.

2. An oxidizing agent generally sodium or potassium chlorate, and

3. A catalyst, generally a salt of a heavy metal, such as iron, manganese, copper, vanadium, lead and the like (e. g. potassium ferrocyanide, copper sulphate).

When these components interact the known black dyeing of the fabric takes place with liberation of mineral acids, which readily destroy the textile material.

It has already been proposed to add to the aforementioned components the salt of a weaker organic acid in order to bind the mineral salt. However, only a very small quantity of such an addition can be used, because large quantities would be liable to prevent the production of aniline black. The protective action of small quantities of such additions is practically insignificant. The addition of large quantities of alkali salts is used in order to produce the so-called reserves. At the places at which these are imprinted the aniline black cannot be developed and the material, therefore, remains white.

Furthermore, it is known, that the addition of certain aromatic amines to the three components above-mentioned acts in a favourable manner, inasmuch as a deeper black is obtained and aniline salt is economized. However, no preservation of the fibers is effected in this way; on the contrary, the fibers are impaired just as much as in the normal process.

The technical and economical advantages of my process are obtained by using, besides the three above-mentioned components of an aniline back composition, one or several organic catalysts amines as a fourth component and large quantities of protective-acting alkali-metal salts of weak, volatile or easily oxidizable acids containing sulphur as a fifth component.

It may be emphasized that the new process is based upon the simultaneous employment of two catalysts, namely a metallic (e. g. potassium ferrocyanide) and an organic catalyst (e. g. p-phenylene-diamine) and of the above mentioned protective salts in large quantities.

In practice it has been found to be advantageous to use a mixture containing an organic catalyst and alkali metal salts of protecting acids in suitable proportions, this mixture being immediately introduced into the slop-pad bath of the aniline black, which always contains the above named three components. The novelty and surprising effect of the invention is therefore that the addition of large quantities of alkali salts of volatile organic acids containing sulphur, which generally act as reserves, and consequently hinder the development of the aniline black, does not act thus if an organic catalyst (amine) is added and that this reaction takes place in presence of a heavy metal catalyst.

According to one form of carrying out my process, the following substances and quantities may be used:

12 parts of aniline hydrochloride, 1 part of hydrochloric acid (conc.), 1 part of copper sulphate, five parts of sodium chlorate, 6 parts of potassium thiocyanate and 2 parts of p-phenylene diamine.

As a further example of my process the following ingredients may be used:

12 parts of aniline hydrochloride, 9 parts of potassium ferrocyanide, 5 parts of sodium chlorate, 5 parts of ammonium sulphite, 2 parts of p-phenylene diamine and 3 parts of tartaric acid.

The textile material which has been imprinted or slop-padded with these solutions is further treated in the usual, known manner, it being suspended in a chamber for several hours in moist heat, or being steamed in a so-called "oxidation steamer" for the purpose of developing the black dye.

If it is necessary to use dyestuffs which are difficult to fix under aniline black, e. g. vat dyes, owing to the fact that the same are not sufficiently fixed by the short steaming process, then in my process the steaming can be carried out for a correspondingly longer period of time, without the textile fibers being appreciably affected.

What is claimed to be new is:

1. In the process of dyeing fibrous material with aniline black a single dye-bath comprising the combination with an aniline salt, an alkali-metal chlorate and a salt of a heavy metal, of an organic catalyst consisting of phenylene diamine and a protectively acting alkali salt consisting of alkali thiocyanate.

2. In the process of dyeing fibrous material with aniline black a single dye-bath comprising the combination with an aniline salt, an alkali-metal chlorate and a salt of a heavy metal, of an organic catalyst consisting of phenylene diamine and a protectively acting alkali salt consisting of potassium thiocyanate, as and for the purposes set forth.

3. As a composition of matter for dyeing fibrous materials with aniline black for preventing weakening of the fiber and for the production of a deep black color which does not turn green, the combination of an organic catalyst consisting of phenylene diamine, and a protective salt consisting of potassium thiocyanate, in the approximate ratio of 1:3.

KARL SCHMIDT. [L. S.]